March 15, 1966  O. M. STUETZER  3,240,994
METHOD OF INCREASING APPARENT VISCOSITY
OF NONCONDUCTIVE FLUIDS
Filed March 2, 1962  2 Sheets-Sheet 2

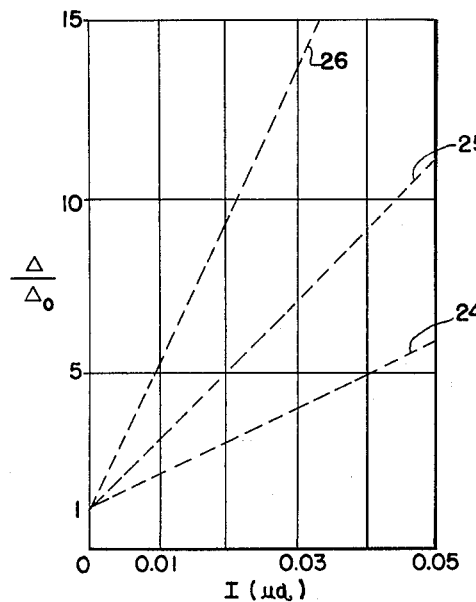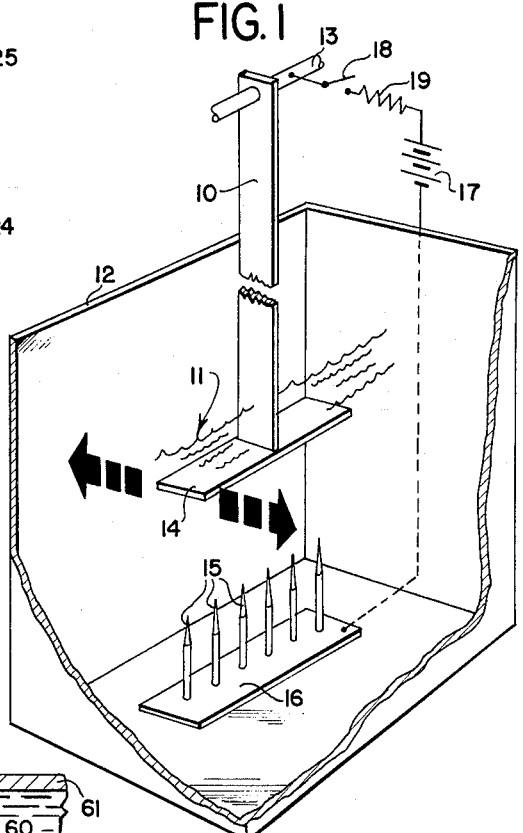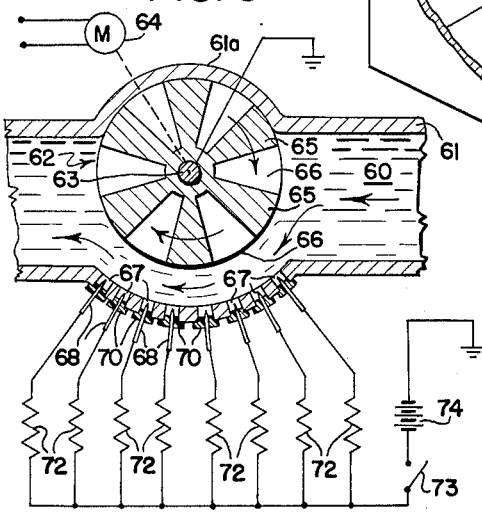

INVENTOR.
OTMAR M. STUETZER
BY
Allen M. Sutton
ATTORNEY

United States Patent Office 3,240,994
Patented Mar. 15, 1966

3,240,994
METHOD OF INCREASING APPARENT VISCOSITY OF NONCONDUCTIVE FLUIDS
Otmar M. Stuetzer, Hopkins, Minn., assignor, by mesne assignments, to Litton Systems, Inc., Beverly Hills, Calif., a corporation of Maryland
Filed Mar. 2, 1962, Ser. No. 176,952
11 Claims. (Cl. 317—3)

This invention relates to a method of increasing the apparent viscosity of a nonconducting fluid, and, more particularly, to such a method utilizing an electrical phenomenon.

The property of a fluid that presents a resistance to flow and causes losses is called viscosity. The viscosity of the fluid depends to a great extent on the magnitude of the van der Waals forces of attraction between the molecules of the fluid. If these forces are high, the molecules are likely to encounter considerable resistance to gliding and rolling over each other, and the viscosity of the fluid will be high.

Among the few known methods for increasing the viscosity of a fluid are increasing the concentration of the fluid or decreasing its temperature. In both of these methods, the chemical and physical properties of the fluid may be changed and the change in viscosity is more or less permanent as opposed to being of a strictly temporary nature. In addition, the change in viscosity of a fluid caused by utilizing one of those methods is not readily controllable and an appreciable length of time is involved in varying the viscosity.

Accordingly, among the various objects of the invention is one to provide a method of selectively increasing the apparent viscosity of a nonconductive fluid wherein the degree of increase is readily controlled and the apparent viscosity may be virtually instantaneously varied.

Another object of the invention is to provide such a method in which the apparent viscosity may be increased temporarily by electrical means without changing the chemical or other physical properties of the fluid.

A further object of the invention is to provide a method for increasing the apparent viscosity of a nonconductive fluid in which the viscosity may be increased only in a particular and predetermined volume constituting a portion of the total volume of fluid involved.

The present invention provides a method of increasing the apparent viscosity of a nonconductive fluid by injecting ions of one polarity into the fluid to create a net space charge and a high electric field therein. The increase in apparent viscosity occurs because of frictional losses in a nonconductive fluid which occur if a net space charge in the fluid, under the influence of an electric field, moves with a velocity different from that of the uncharged part of the fluid. Appreciable viscosity increase effects are obtained if the fluid is not free to move in the direction of the electrical field. This occurs, for example, if the fluid is in a narrow channel or is confined in a container so that it has only one free surface.

The theory underlying the electrical phenomenon that causes the apparent viscosity increase is fully set forth in a paper by Otmar M. Stuetzer entitled, "Apparent Viscosity of a Charged Fuid," which was published in Physics of Fluids, 4, page 1226 (October 1961). In view of that article, to which reference is hereby made, the theory of the phenomenon will not be discussed herein.

A better understanding of the invention, together with further objects and advantages thereof, will be obtained from the following description, taken in conjunction with the accompanying drawings, in which:

FIG. 1 is a diagrammatic perspective view, with parts broken away, of an arrangement utilizing the method of the invention to increase the apparent viscosity of a liquid;

FIG. 2 is a graph showing the apparent viscosity increase in the arrangement shown in FIG. 1 when various parameters are varied;

FIG. 6 is a diagrammatic sectional view of a pump arrangement utilizing the method of the invention.

Figure 4:
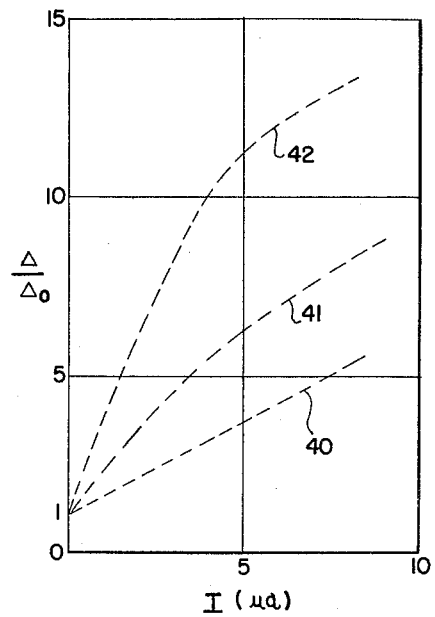
FIG. 4 is a graph showing the apparent viscosity increase in the arrangement of FIG. 3, when various parameters are varied.

As discussed in the foregoing article, ions injected into a nonconductive fluid create a net space charge in the fluid. If that net space charge in the fluid, under the influence of an electric field, moves with a velocity different from that of the uncharged part of the fluid, it results in an increase in frictional losses, which create an increase in the apparent viscosity of the fluid. Of course, if the fluid is free to move in the direction of the electric field, the frictional losses cause the fluid to move faster in that direction or, in other words, to be pumped. Conversely, if the fluid is moving in a direction opposed to the direction of the electric field, the fluid motion will be attenuated. The method of the present invention is of particular utility when the space charge is in a near stationary condition with respect to the container of the fluid or with respect to moving electrodes which are to be damped.

The term "nonconductive fluid" is used herein to include both truly insulating and poorly conductive liquids as well as normally nonconductive gases. Examples of such liquids are lubricating oils, machine oil, silicone oil, castor oil, octane and kerosene, to name but a few. Examples of normally nonconductive gases are air and the noble gases.

FIG. 1 illustrates an arrangement employing the method of the invention to damp reciprocal motion of a pendulum 10 whose lower end extends into a liquid 11 confined in a container 12. The pendulum 10 depends from a shaft 13 and is provided at its lower end, below the surface of the liquid 11, with a horizontal arm 14.

The liquid 11 confined within the container 12 is a nonconductive liquid of the type previously mentioned. In the embodiment illustrated, ionizing means in the form of a plurality of corona discharge points 15 extend upwardly from a conductive support 16 on the bottom of the container 12 toward the horizontal arm 14 of the pendulum. In order to make electrical contact with the arm 14 conveniently, the shaft 13, pendulum 10 and arm 14 may all be made of conductive material.

The electrical circuit to energize the corona discharge points 15 may be made by connecting the support 16 to one side of a unidirectional high potential source 17, the other side of which is connected to the shaft 13 through a switch 18 and a current-limiting resistor 19.

It is assumed that, at the start of operation, the pendulum 10 and the horizontal arm 14 are vibrating or oscillating in the direction shown by the heavy arrow. The motion of the pendulum is damped by the liquid 11 and by mechanical bearing friction, giving its oscillation a logarithmic amplitude decrement $\Delta_0$. If now the switch 18 is closed to energize the ionizing means, unipolar ions are injected into the nonconductive liquid 11 by the corona discharge points 15. The ions create a net space charge in the nonconductive fluid 11 and, because of the high electric field existing in the fluid, the ions move upwardly toward the horizontal arm 14. Because the liquid 11 is contained and hence is not free to move in the direction of the electric field, the frictional losses between the ions and the uncharged part of the fluid increase the apparent viscosity of the liquid in the volume between the corona discharge points 15 and the horizontal arm 14. Thus, the oscillation of the pendulum 15 has a new logarithmic decrement $\Delta$, which is greater than its original decrement $\Delta_O$.

Although various arrangements are possible and will no doubt suggest themselves to one skilled in the art, it has been found that the unidirectional high potential source 17 preferably has a value of the order of 10,000 volts and the current-limiting resistor 19 may have a value of the order of $2 \times 10^9$ ohms. With such an arrangement, the current flowing through the circuit, including a typical nonconductive liquid, is in the range of hundredths of a microampere. The number and arrangement of the corona discharge points may, of course, be varied to suit the particular application.

The graph of FIG. 2 illustrates the apparent increase in viscosity of a nonconductive liquid such as octane as a function of current flowing in the energizing circuit. The ratio of the logarithmic amplitude decrements $\Delta$ and $\Delta_O$, previously defined, are plotted as the ordinate of the graph and current flow, in microamperes, is plotted as the abscissa. The lower curve 24 depicts the results obtained experimentally when the horizontal arm 14 was spaced 40 mm. above the tips of the corona discharge points 15 and the pendulum 10 was oscillating with a period of approximately 1.5 seconds. The intermediate curve 25 shows the increase in apparent viscosity with the same spacing between the horizontal arm and the corona discharge point, but with the pendulum oscillating with a period of approximately 2.1 seconds. The upper curve 26 represents the result when the spacing between the horizontal arm 14 and the tips of the corona discharge points 15 was decreased from 40 mm. to 20 mm. with the period of the pendulum still remaining at approximately 2.1 seconds. The curves in FIG. 2 are shown only for purposes of illustration and are not to be construed as in any way limiting or defining the invention. In actual practice, even though the maximum increase in apparent viscosity is shown in FIG. 2 as being 15:1, it has been found that an apparent increase of many times that amount can be easily obtained.

Figure 3:
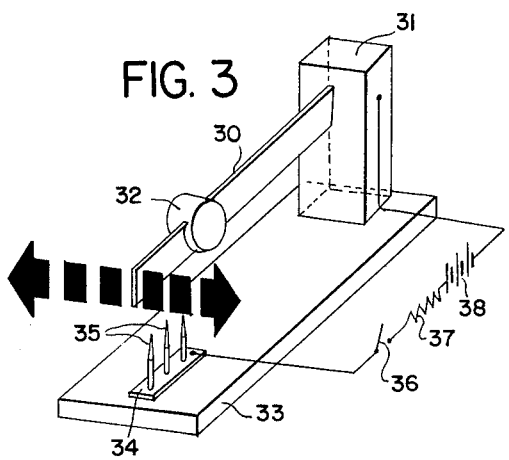
FIG. 3 is a perspective diagrammatic view showing the method of the invention applied to increasing the apparent viscosity of a fluid medium such as air.

FIG. 3 illustrates the method of the invention applied to damping the vibration of a reed 30, which is vibrating in a nonconductive fluid such as air. The reed 30 is secured at one end in a pedestal 31 and near its other end is provided with a weight 32 which may be moved along the reed 30 to vary its period of vibration.

The pedestal 31 is mounted on a base plate 33 that also carries ionizing means in the form of a plurality of corona discharge points 35 that extend upwardly from a conductive strip 34 toward the reed 30. If the pedestal 31, the reed 30, and the strip 34 are all made of conductive material, the ionizing means may be energized by connecting the strip 34 through a switch 36 and current-limiting resistor 37 to one side of a high potential unidirectional source 38. The other side of the source 38 may be connected to the pedestal 31.

If it is assumed that the reed 30 is initially vibrating in the direction shown by the heavy arrows, it has a logarithmic amplitude decrement $\Delta_O$. When the switch 36 is closed, ions are injected from the corona discharge points 35 into the nonconductive fluid between the corona discharge points and the outer end of the reed 30. The net space charge in the fluid and the direction of movement of that space charge under the influence of the high electric field existing between the reed and the corona discharge points has a component that opposes the vibrational movement of the reed. Thus, there is an increase in the apparent viscosity of the nonconductive fluid and the vibrating reed has a new logarithmic amplitude decrement $\Delta$. As in the arrangement previously described, the unidirectional high potential source 38 may conveniently have a value of the order of 10,000 volts, and the current-limiting resistor 37 a value of the order of $2 \times 10^9$ ohms. However, attention is drawn to the fact that the air is somewhat more conductive than the liquid utilized in the arrangement of FIG. 1, and so somewhat more current flows in the circuit shown in FIG. 3. The current flow, however, is still of the order of a few microamperes.

FIG. 4 is a graph similar to FIG. 2 previously discussed, but presents experimental results of the operation of the arrangement shown in FIG. 3. The apparent increase in viscosity ($\Delta/\Delta_O$) again is the ordinate and the current flow in microamperes is the abscissa.

In the figure, the lower curve 40 indicates the increase in apparent viscosity as a function of current flow when the distance between the tops of the corona discharge points 35 and the lower edge of the reed 30 was 17.2 mm. and the period of vibration of the reed was approximately 0.17 second. The intermediate curve 41 shows the results obtained when the spacing was 8.6 mm. and the period of vibration was increased to 0.3 second. The upper curve 42 represents the increase in apparent viscosity when the spacing between the points and the reed was 17.2 mm. and the period was 0.3 second. It is pointed out that one would normally expect the curves 41 and 42 to be interchanged; that is, one would expect that if the spacing is decreased, there would be a greater increase in apparent viscosity. However, when operating in a nonconductive fluid such as air, the distance dependence does not hold. If the distance is further increased, however, the effect is reversed and less increase in apparent viscosity is obtained.

Figure 5:
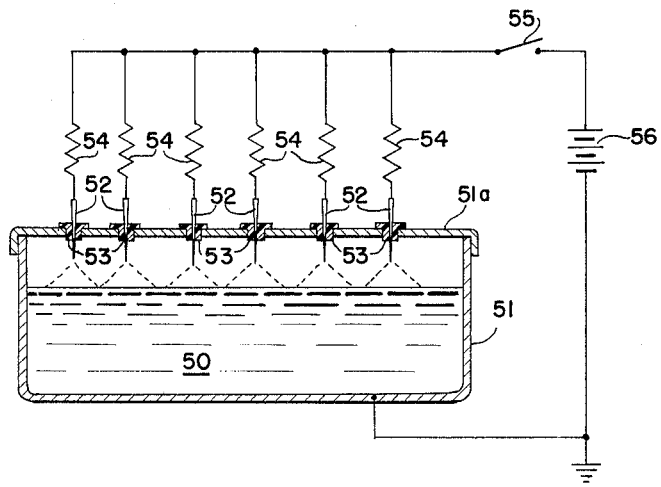
FIG. 5 is a diagrammatic sectional view showing the method of the invention applied to an anti-sloshing arrangement for a liquid contained in a tank or container.

FIG. 5 illustrates the application of the method of the invention to a non-sloshing arrangement for a nonconductive liquid 50 contained in a conductive tank 51. The tank 51 is provided with a removable cover 51a through which a plurality of corona discharge points 52 extend, each corona discharge point 52 extending into the interior of the tank through an insulating bushing 53 and being provided with its own current-limiting resistor 54. The ionizing means may be energized by connecting the corona discharge points 52 and current-limiting resistors 54 in parallel through a switch 55 to one side of a unidirectional high potential source 56. The other side of the high potential source 56 may be connected to the conductive container 51 and grounded if desired for safety purposes.

The anti-sloshing device shown in FIG. 5 operates in much the same manner as those embodiments of the invention previously discussed. When the switch 55 is closed, ions are injected into the liquid 50 by the corona discharge points 52 to create a net space charge in the nonconductive liquid 50. That space charge, under the influence of the high electric field existing between the corona discharge points and the container 51 moves in a direction to oppose any sloshing of the liquid 50. Thus, the nonconductive liquid 50 has an increase in its apparent viscosity which works against any tendency to slosh.

As in the arrangements previously described, the current-limiting resistors 54 may be of the order of $2 \times 10^9$ ohms and the unidirectional high potential source 56 may be of the order of 10,000 volts. Of course, the number and arrangement of corona discharge points 52, as well as the value of the potential source 56, may be varied to suit the particular application.

FIG. 6 illustrates diagrammatically the application of the method of the invention to a "viscosity pump," which moves the liquid because it adheres to the rotor of the pump because of its viscosity. Among the advantages of a viscosity pump over more conventional pumps are that there are much lower cavitation losses and slurries may be pumped much more easily. Heretofore, however, it has been possible to pump only highly viscous liquids by this means, which resulted in the losses in the non-pumping parts of the system being quite high. Utilizing the method of the present invention, however, much less viscous liquids can be pumped with a viscosity pump.

As seen in FIG. 6, a nonconductive liquid 60 that it is desired to pump is contained within a pipe or conduit 61. The conduit 61 is provided with an enlarged portion 61a within which is mounted a rotor 62 on a rotatable shaft 63. The shaft 63 is substantially at right angles to the axis of the conduit 61 and is off center, so that the rotor 62 is positioned quite close to one wall of the enlarged portion 61 but leaves a substantial space for the passage of the liquid between the other wall of the enlarged portion and the rotor. The shaft 63 may be mechanically connected to and rotated by a motor 64 or by other suitable conventional means.

The rotor 62 preferably comprises a plurality of alternate conductive and nonconductive segments 65 and 66, respectively, with the conductive segment 65 being electrically connected to ground through the conductive shaft 63.

The wall of the enlarged portion 61a of the conduit 61 that is spaced from the rotor 62 is provided with a plurality of openings 67. A corona discharge point 68 extends through an insulating bushing 70 into each of the openings 67. Each corona discharge point 68 is provided with a current-limiting resistor 71 and they are connected in parallel through a switch 72 to one side of a unidirectional high potential source 73. The other side of the high potential source 74 may be grounded to complete the electrical circuit.

In operation, when the switch 73 is closed, ions are ejected by the corona discharge points 68 into the liquid 60 to create a net space charge in that volume of the liquid between the corona discharge points and the rotor 62. That space charge, moving under the influence of the high electric field existing between the corona discharge points and the rotor, has a component of motion in a direction across the flow path of the nonconductive liquid 60. This results in an increase in the apparent viscosity of the liquid 60 in that volume between the corona discharge points and the rotor 62. Thus, the liquid tends to adhere to the rotor because of the increase in apparent viscosity and is pumped along the conduit 61 in the direction of the arrows as the rotor rotates in a clockwise direction.

Again, as in the arrangements previously described, the current-limiting resistors 72 may conveniently have a value of the order of $2 \times 10^9$ ohms, and the unidirectional high potential source 74 may be of the order of 10,000 volts. Of course, the number and arrangement of the corona discharge points, as well as the value of the high potential source 74, may be varied to suit the particular application.

Although it has been stated, with reference to all of the embodiments described, that the high potential source may be of the order of 10,000 volts, its value may be varied up to as much as 30,000–40,000 volts in some applications. Also, there are some instances, for example, when the spacing between the electrodes in the fluid is quite small, where an alternating current source may be utilized. The primary purpose of the current-limiting resistors is to act as a safety feature. Therefore, the exact values of the resistors are not of great importance to the invention.

It is now apparent that the method of the invention fully meets the objectives set forth above. The degree of increase in apparent viscosity of a nonconductive fluid may be selectively controlled by controlling the current flow therethrough and it may be virtually instantaneously increased and decreased by electrical means. The chemical and physical properties of the fluid, other than its apparent viscosity, are not changed, and the effect of increasing the apparent viscosity is strictly temporary. The apparent viscosity may be increased in a particular, predetermined volume of non-conductive fluid as determined by the location of the ionizing means with respect to the total volume of fluid.

Although several arrangements utilizing the method of the invention have been illustrated and described, many other arrangements and variations will occur to one skilled in the art which are within the true spirit and scope of the invention.

What is claimed is:

1. A method of increasing the apparent viscosity of a nonconductive liquid, which comprises injecting ions of one polarity into the nonconductive liquid to create a space charge and a high electric field in the nonconductive liquid, and causing movement of at least a portion of said liquid.

2. A method of increasing the apparent viscosity of a nonconductive liquid, which comprises the steps of positioning ionizing means to inject ions into the nonconducting liquid, energizing said ionizing means from a unidirectional high potential source to create a space charge and a high electric field in the nonconductive liquid, and moving said liquid relative to its surroundings.

3. A method of increasing the apparent viscosity of a nonconductive liquid, which comprises the steps of positioning corona discharge means to inject ions into the non-conducting liquid, energizing said corona discharge means from a unidirectional high potential source to create a space charge and a high electric field in the non-conductive liquid, and moving the liquid relative to its surroundings.

4. A method of increasing the apparent viscosity of a nonconductive liquid in the neighborhood of a conductive member in contact with the liquid, which comprises the steps of positioning ionizing means in the neighborhood of the conductive member, providing a unidirectional high potential between the ionizing means and the conductive member to inject ions into the nonconductive liquid and create a high electric field in the neighborhood of the conductive member, and causing movement of said liquid.

5. A method of increasing the apparent viscosity of a selected portion of a nonconductive fluid volume in the neighborhood of a conductive member in contact with the fluid, which comprises the steps of positioning corona discharge means in the neighborhood of the conductive member and in relatively fixed relationship thereto, effecting relative movement between said conductor and said fluid volume, providing a unidirectional high potential between the said fixed corona discharge means and the conductive member to inject ions into the said selected portion of nonconductive fluid and create a high electric field in the neighborhood of the conductive member, and producing a damping effect on said relative movement.

6. A method of selectively increasing the apparent viscosity of a selected portion of a volume of nonconductive fluid in the neighborhood of a conductive member in contact with the fluid, which comprises the steps of positioning ionizing means in the neighborhood of the conductive member and in relative fixed relationship thereto, effecting relative movement between said conductor and said fluid volume, selectively providing a unidirectional high potential between the ionizing means and the conductive member to inject ions into the nonconductive fluid and create a high electric field in the neighborhood of the conductive member, and effecting a damping of said relative movement.

7. A method of increasing the apparent viscosity of a nonconductive fluid to damp motion of a movable conductive member immersed therein, which comprises the steps of immersing ionizing means in the nonconductive fluid spaced from the movable conductive member, and providing a unidirectional high potential between the ionizing means and the movable conductive member to inject ions into the nonconductive fluid to create a high electric field between the ionizing means and the movable conductive member.

8. A method of selectively increasing the apparent viscosity of a nonconductive fluid to damp motion of a movable conductive member immersed therein, which comprises the steps of immersing ionizing means in the nonconductive fluid spaced from the movable conductive member, and selectively providing a unidirectional high potential between the ionizing means and the movable conductive member to inject ions into the nonconductive fluid to create a high electric field between the ionizing means and the movable conductive member.

9. A method of selectively increasing the apparent viscosity of a nonconductive fluid to damp motion of a movable conductive member immersed therein, which comprises the steps of immersing corona discharge means in the nonconductive fluid spaced from the movable conductive member, and selectively providing a unidirectional high potential between the corona discharge means and the movable conductive member to inject ions selectively into the nonconductive fluid to create a high electric field between the corona discharge means and the movable conductive member.

10. A method of increasing the apparent viscosity of a nonconductive fluid contained in a conductive container to prevent sloshing of the fluid, which comprises the steps of positioning ionizing means to inject ions into the nonconductive fluid, and providing a unidirectional high potential between the ionizing means and the conductive container to create a high electric field within the nonconductive fluid.

11. A method of increasing the apparent viscosity of a nonconductive fluid contained in a conductive container to prevent sloshing of the fluid, which comprises the steps of positioning corona discharge means above the surface of the nonconductive fluid, and providing a unidirectional high potential between the corona discharge means and the conductive container to inject ions into the nonconductive fluid and create a high electric field therein.

References Cited by the Examiner
UNITED STATES PATENTS

| | | | |
|---|---|---|---|
| 2,417,850 | 3/1947 | Winslow | 317—262 |
| 2,499,467 | 3/1950 | De Forest et al. | 317—3 |
| 2,661,596 | 12/1953 | Winslow | 192—21.5 X |
| 2,710,589 | 6/1955 | Brunner | 317—3 |
| 3,108,893 | 10/1963 | Oliphant | 117—93.4 X |

SAMUEL BERNSTEIN, *Primary Examiner.*

MAX L. LEVY, *Examiner.*